(12) United States Patent
Maehasi

(10) Patent No.: US 8,134,904 B2
(45) Date of Patent: Mar. 13, 2012

(54) INFORMATION RECORDING METHOD AND INFORMATION RECORDING APPARATUS FOR RECORDING MEDIUM

(75) Inventor: Takenori Maehasi, Katano (JP)

(73) Assignee: Panasonic Corporation, Osaka (JP)

( * ) Notice: Subject to any disclaimer, the term of this patent is extended or adjusted under 35 U.S.C. 154(b) by 906 days.

(21) Appl. No.: 10/569,690

(22) PCT Filed: Jul. 21, 2005

(86) PCT No.: PCT/JP2005/013793
§ 371 (c)(1),
(2), (4) Date: Feb. 27, 2006

(87) PCT Pub. No.: WO2006/009310
PCT Pub. Date: Jan. 26, 2006

(65) Prior Publication Data
US 2008/0212445 A1    Sep. 4, 2008

(30) Foreign Application Priority Data

Jul. 22, 2004   (JP) ................................. 2004-214307

(51) Int. Cl.
*G11B 7/00* (2006.01)
(52) U.S. Cl. ........................ 369/94; 369/53.24
(58) Field of Classification Search ............... 369/44.27, 369/53.24, 53.22, 59.25, 94, 44.26, 47.27, 369/275.3, 47.51, 47.22, 53.1, 53.29, 53.31, 369/53.4; 396/311; 386/112, 95, 52, 125; 711/112, 4, 6.13
See application file for complete search history.

(56) References Cited

U.S. PATENT DOCUMENTS

| 6,118,924 | A | 9/2000 | Nakatani et al. |
| 6,317,403 | B1 * | 11/2001 | Ono et al. ........................ 369/94 |
| 6,480,669 | B1 * | 11/2002 | Tsumagari et al. ............. 386/95 |
| 6,564,016 | B1 * | 5/2003 | Nakajima et al. ............. 396/311 |
| 7,254,318 | B2 * | 8/2007 | Imada et al. ................. 386/112 |
| 2004/0120241 | A1 | 6/2004 | Kobayashi et al. |

FOREIGN PATENT DOCUMENTS

| JP | 2000-48542 | 2/2000 |
| JP | 2000-201320 | 7/2000 |
| JP | 2003-7035 | 1/2003 |
| JP | 2003-16648 | 1/2003 |
| JP | 2003-331430 | 11/2003 |
| JP | 2004-158173 | 6/2004 |
| WO | 03/107334 | 12/2003 |

* cited by examiner

*Primary Examiner* — Nabil Hindi
(74) *Attorney, Agent, or Firm* — Wenderoth Lind & Ponack, L.L.P.

(57) ABSTRACT

A recording method for recording data in basic reproduction unit to a recording medium having a first recording layer and a second recording layer, includes detecting a size of an unrecorded region of the first recording layer while recording data in the basic reproduction unit in the first recording layer, comparing the size of the unrecorded region of the first recording layer with a specified value and stopping recording in the first recording layer at the boundary of the basic reproduction unit when the size of the unrecorded region is smaller than the specified value, and recording a subsequent data in the second recording layer.

22 Claims, 11 Drawing Sheets

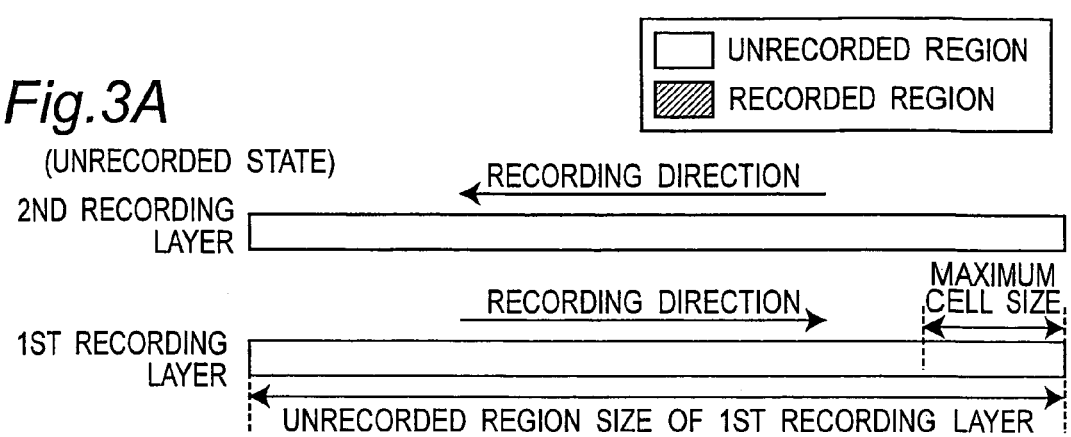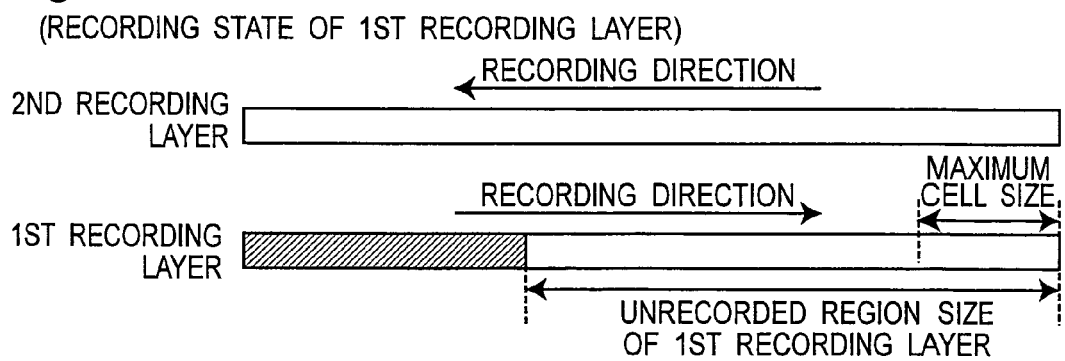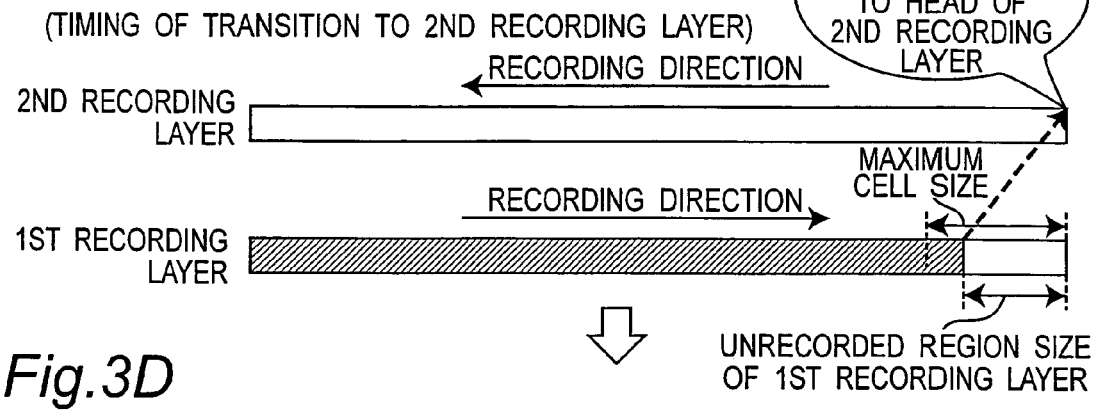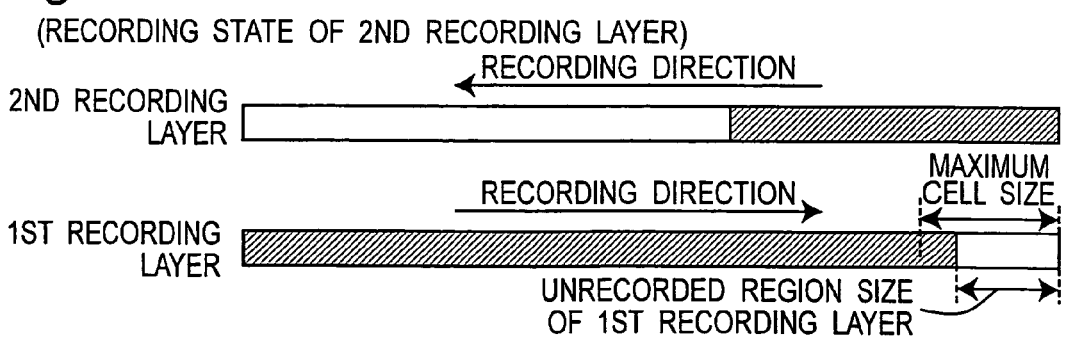

(RECORDING STATE OF 1ST RECORDING LAYER)

(TIMING OF TRANSITION TO 2ND RECORDING LAYER)

(RECORDING STATE OF 2ND RECORDING LAYER)

Fig. 8A
(UNRECORDED STATE)

☐ UNRECORDED REGION
▨ RECORDED REGION
▦ REGION WITH RECORDED DUMMY DATA

2ND RECORDING LAYER ← RECORDING DIRECTION

1ST RECORDING LAYER — RECORDING DIRECTION → | MAXIMUM CELL SIZE |
← UNRECORDED REGION SIZE OF 1ST RECORDING LAYER →

⇩ RECORDING START

Fig. 8B
(RECORDING STATE OF 1ST RECORDING LAYER)

2ND RECORDING LAYER ← RECORDING DIRECTION

1ST RECORDING LAYER — RECORDING DIRECTION → | MAXIMUM CELL SIZE |
← UNRECORDED REGION SIZE OF 1ST RECORDING LAYER →

⇩

Fig. 8C
(TIMING OF TRANSITION TO 2ND RECORDING LAYER)

(MOVE RECORDING POSITION TO POSITION ON 2ND RECORDING LAYER CORRESPONDING TO RECORDING END POSITION ON 1ST RECORDING LAYER)

2ND RECORDING LAYER ← RECORDING DIRECTION

1ST RECORDING LAYER — RECORDING DIRECTION → | MAXIMUM CELL SIZE |
← UNRECORDED REGION SIZE OF 1ST RECORDING LAYER →

⇩

Fig. 8D
(RECORDING STATE OF 2ND RECORDING LAYER)

UNRECORDED REGION SIZE OF 2ND RECORDING LAYER

2ND RECORDING LAYER ← RECORDING DIRECTION — R2

1ST RECORDING LAYER — RECORDING DIRECTION → | MAXIMUM CELL SIZE | — R1
← UNRECORDED REGION SIZE OF 1ST RECORDING LAYER →

(RECORDING STATE OF 1ST RECORDING LAYER)

(TIMING OF TRANSITION TO 2ND RECORDING LAYER)

(RECORDING STATE OF 2ND RECORDING LAYER)

INFORMATION RECORDING METHOD AND INFORMATION RECORDING APPARATUS FOR RECORDING MEDIUM

BACKGROUND OF THE INVENTION

1) Technical Field

The present invention relates to a recording method and a recording apparatus for recording medium having two recording layers.

2) Description of Related Background Art

Hitherto, a DVD (digital versatile disc) is known as recording medium for recording video, audio, computer data, and other various contents. Depending on the application, various standards of DVD have been specified. One of them is DVD-Video standard (see pages VI 3-5 of non-patent document 1).

In the DVD-Video standard, a basic reproduction unit of AV data is defined as a "Cell", and reproduction sequence is controlled. In particular, in a recording medium having two information recording layers, it is designated that one Cell should not be recorded in plural recording layers.

Accordingly, in commercial DVD-Video software, in order to record AV data in recording medium having two layers by conforming to DVD-Video format, the AV data to be recorded in each layer is preliminarily edited and recorded so that one Cell should not be recorded in plural layers (see, for example, patent document 1, non-patent document 1).

By using DVD recorder, however, when recording in real time in a recording medium having two layers, the AV data cannot be recorded by authoring preliminarily so that one Cell should not be recorded in plural layers, it was impossible to record in conformity with DVD-Video standard.

Patent document 1: JP, 2000-48542, A

Non-patent document 1: DVD Specifications for Read-Only Disc Part 3, version 1.0 Aug. 1996

That is, it is impossible to record in real time so as to conform to DVD-Video standard designating "one Cell should not be recorded over plural layers."

SUMMARY OF THE INVENTION

The invention is devised to solve this problem, and it is hence an object thereof to present an information recording apparatus and a recording method capable of recording AV data in real time to a recording medium having two information recording layers while satisfying the required specification.

A first aspect of the invention provides a recording method for recording data in basic reproduction unit to a recording medium having a first recording layer and a second recording layer. The basic reproduction unit may include a plurality of data units having continuity in time, and each data unit may be a minimum unit for recording and reproducing data to a recording medium. The recording method includes the steps of detecting a size of an unrecorded region of the first recording layer, while recording data in reproduction basic unit in the first recording layer, comparing the size of the unrecorded region of the first recording layer with a specified value, and stopping recording into first recording layer at boundary of the basic reproduction unit when the size of the unrecorded region is smaller than the specified value, and recording a subsequent data in the second recording layer.

A second aspect of the invention presents an information recording apparatus for recording data in basic reproduction unit in a recording medium having a first recording layer and a second recording layer. The information recording apparatus includes an encoder operable to encode data, a buffer operable to temporarily store the encoded data, a drive operable to record the encoded data in the first or second recording layer of the recording medium, a recording controller operable to control the encoder, buffer and drive, and a detector operable to detect whether the recording position of the first recording layer reaches an end of the first recording layer while recording data in the basic reproduction unit in the first recording layer. The detector detects a size of an unrecorded region of the first recording layer, and compares the size of the unrecorded region of the first recording layer with a specified value, and determines that the recording position of the first recording layer reaches an end of the first recording layer when the size of the unrecorded region becomes smaller than the specified value. When it is determined that the recording position of the first recording layer reaches the end, the controller controls recording so as to stop the recording in the first recording layer at the boundary of the basic reproduction unit, and record a subsequent data in the second recording layer.

According to the invention, data of basic reproduction unit is prevented from being recorded in two layers, in a recording medium having two recording layers. It is hence possible to satisfy the requirement specified, for example, in DVD-Video standard.

BRIEF DESCRIPTION OF DRAWINGS

FIGS. 3A to 3D are explanatory diagrams of changeover method from a first recording layer to a second recording layer in embodiment 1 of the invention.

FIGS. 8A to 8D are explanatory diagrams of changeover method from the first recording layer to the second recording layer in embodiment 4 of the invention.

DETAILED DESCRIPTION OF THE INVENTION

Referring now to the accompanying drawings, preferred embodiments of the invention are described specifically below.

Figure 1:
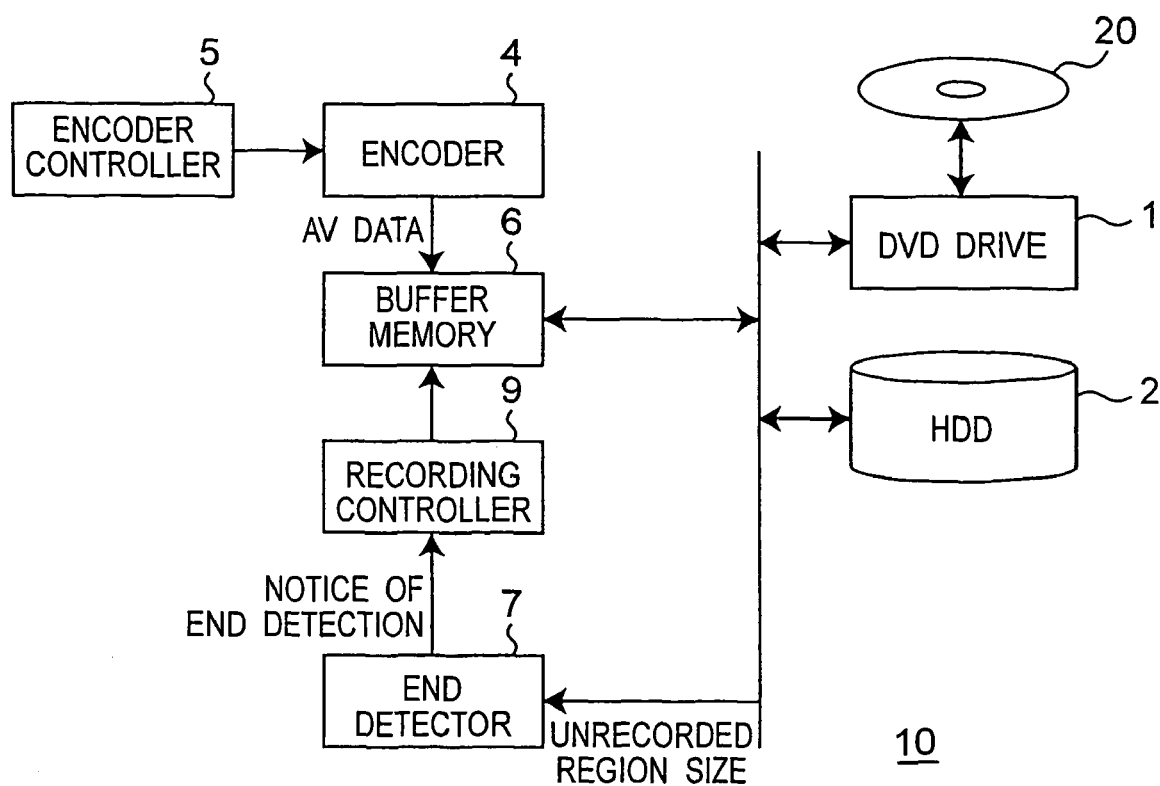
FIG. 1 is a block diagram of an information recording apparatus in embodiment 1 of the invention.

FIG. 1 is a block diagram of information recording apparatus according to the invention. An information recording apparatus 10 records information in a recording medium 20 having two recording layers (first recording layer, second recording layer). In this embodiment, as an example of recording medium 20, a recording medium conforming to DVD standard is used. The information recording apparatus 10 of the embodiment conforms to DVD-Video standard, and can record one Cell (detail described blow) within on layer only, in real-time recording to the recording medium 20 having two recording layers.

As shown in FIG. 1, an information recording apparatus 10 includes a DVD drive 1 for recording and reproducing data to the recording medium (DVD) 20 and a hard disk drive 2, as data storing means. The information recording apparatus 10 further includes an encoder 4 for encoding and generating AV data to be recorded, an encoder controller 5 for controlling the encoder 4, a buffer memory 6 for temporarily storing the AV data to be recorded, an end detector 7 for detecting whether a recording position of the recording medium nearly reaches the end of the first recording layer and issuing an end detection notice signal, and a recording controller 9 for controlling data recording to the DVD drive 1.

The encoder 4 generates data to be recorded to a recording medium 20, and writes the data into the buffer memory 6. The data written in the buffer memory 6 is sequentially recorded into the recording medium 20 by the DVD drive 1. While the data is being recorded in the first recording layer, the end detector 7 detects a size of unrecorded region of the recording medium 20, and issues the end detection notice signal when the size becomes smaller than a specified value. On receiving the end detection notice signal, the recording controller 9 changes over the recording layer from the first recording layer to the second recording layer.

An information recording apparatus 10 includes the hard disk drive 2 which is a recording medium different from the DVD drive 1. Hence, data can be dubbed between the DVD drive 1 and hard disk drive 2.

Herein, the Cell is a basic reproduction unit of AV data specified by DVD standard, and is composed of plural VOBUs (Video Object Units) which are disposed continuously in logical address (that is, having continuity in time). The Cell is defined in the navigation data as basic unit of reproduction by the control software of the device. A size of Cell can be set arbitrarily in a range of a specified upper limit (maximum Cell number) as far as the SCR (system clock reference) and PTM (presentation time) are continuous and attributes such as aspect ratio (4:3 or 16:9) are not changed.

In this embodiment, of the two recording layers of the recording medium 20, a layer in which data is first recorded is called "first recording layer" and next layer to be recorded is called "second recording layer." The first recording layer is preferably at a side farther from the medium surface to be irradiated with light. Recording is started from the first recording layer, and when the vacant capacity of the first recording layer become smaller than a specified value, the recording layer is changed from the first recording layer to the second recording layer. Data is recorded in the first recording layer in a direction from inner circumference to outer circumference of recording medium 20, while recorded in the second recording layer in a direction from the outer circumference to the inner circumference. Same effects can be obtained when the recording direction is reverse.

Figure 2:
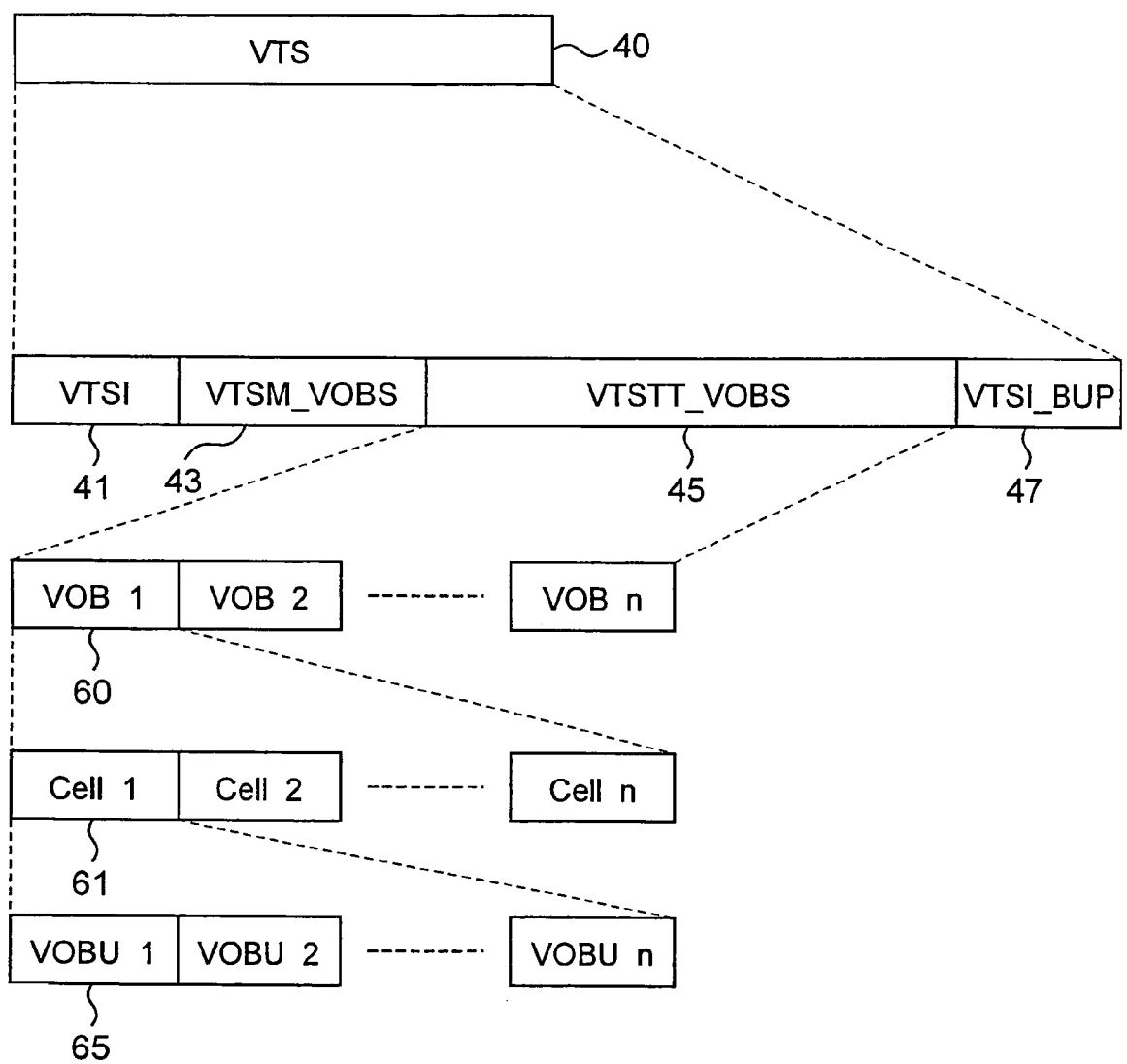
FIG. 2 is a diagram of AV data conforming to DVD-Video standard.

Referring to FIG. 2, configuration of AV data conforming to DVD-Video standard is explained. In DVD-Video standard, every program has a data structure called VTS (Video Title Set) 40. VTS 40 is composed of VTSI (41) as AV data control information and menu control information, VTSM_YOBS (43) as MPEG2 data for menu, VTSTT_YOBS (45) as MPEG2 data of AV data, and VTSI_BUP (47) as backup data of VTSI. VTSTT_YOBS is composed of a plurality of units called VOBs (Video Objects) 60 specified in ISO/IEC 13818-1. Further, VOB (60) is composed of a plurality of Cells (61) which are units for starting or ending reproduction. The Cell (61) is composed of a plurality of MPEG2 data of about 0.4 to 1.2 seconds called VOBUs (video object units) (65) as minimum units for recording and reproduction to the recording medium. According to pages VI 3-5, section 3.1.5 of non-patent document 1, one Cell is required to be present wholly in one recording layer.

FIGS. 3A to 3D are explanatory diagrams of data recording method in two recording layers in this embodiment. In this embodiment, the maximum Cell size is compared with unrecorded region size of the first recording layer, and when the unrecorded region size becomes smaller than the maximum Cell size, the recording layer is changed to the second recording layer.

The maximum Cell size is the upper limit of Cell size, and is determined depending on the specification of the information recording apparatus 10, that is, control of the encoder for generating AV data. In the DVD-Video standard, since the number of Cells per title is limited to the maximum of 255, when recording one title by using the first recording layer and the second recording layer, the maximum Cell size is preferred to be 34 MB or more. When recording plural titles, the maximum Cell size may be controlled to be set larger than the value obtained by dividing the total remaining capacity of the first and second recording layers by 255 by the encoder 4, thus to change the value of maximum Cell size properly.

Figure 4:
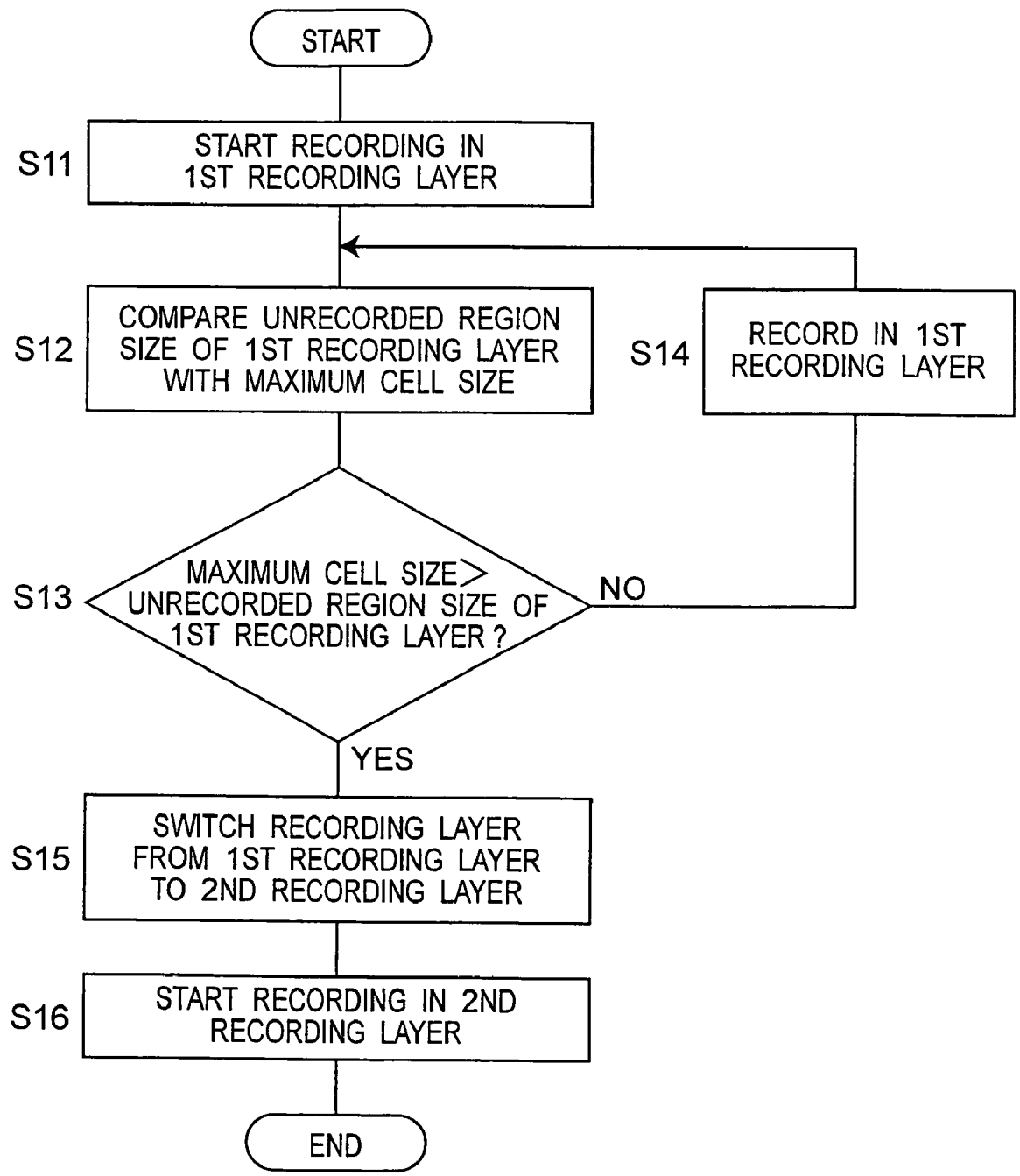
FIG. 4 is a flowchart of recording process for changing over from the first recording layer to the second recording layer in embodiment 1 of the invention.

FIG. 4 is a flowchart of changeover process of recording layers in this embodiment. A size of unrecorded region of the first recording layer is equal to the entire capacity of the first recording layer when unrecorded as shown in FIG. 3A. When recording starts, the size decreases by the recorded portion as shown in FIG. 3B. The recording controller 9 starts recording from the first recording layer (S11). The end detector 7 compares unrecorded region size of the first recording layer with the maximum Cell size (S12). When the maximum Cell size is smaller than the unrecorded region size of the first recording layer (No at S13), an end detection notice signal showing "Not detected" is issued. At this time, the recording controller 9 continues to record in the first recording layer (S14). On the other hand, when the maximum Cell size is greater (Yes at S13), the end detector 7 issues an end detection signal showing "Detected." At this time, the recording controller 9 stops recording in the first recording layer at the Cell boundary, and changes over the recording layer to the second recording layer (S15) (see FIG. 3C), and thereafter AV data is recorded in the second recording layer (S16) (see FIG. 3D).

Thus, in the recording method according to this embodiment, one Cell is not recorded in two layers.

This embodiment relates to other method of changeover from first recording layer to second recording layer. The configuration of the information recording apparatus is same as in embodiment 1.

According to DVD-Video standard cited in non-patent document 1, information called "Navigation pack" which includes reproduction control information and search information for AV data compiled on the basis of AV data (MPEG data) 51 in Cell must be attached to the beginning of Cell data.

Figure 5A:
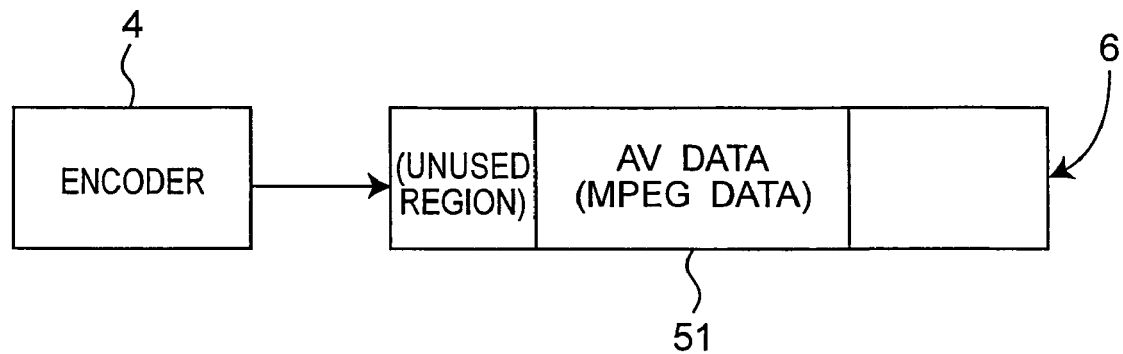
FIGS. 5A and 5B are explanatory diagrams of changeover method from the first recording layer to the second recording layer in embodiment 2 of the invention.
Figure 5B:
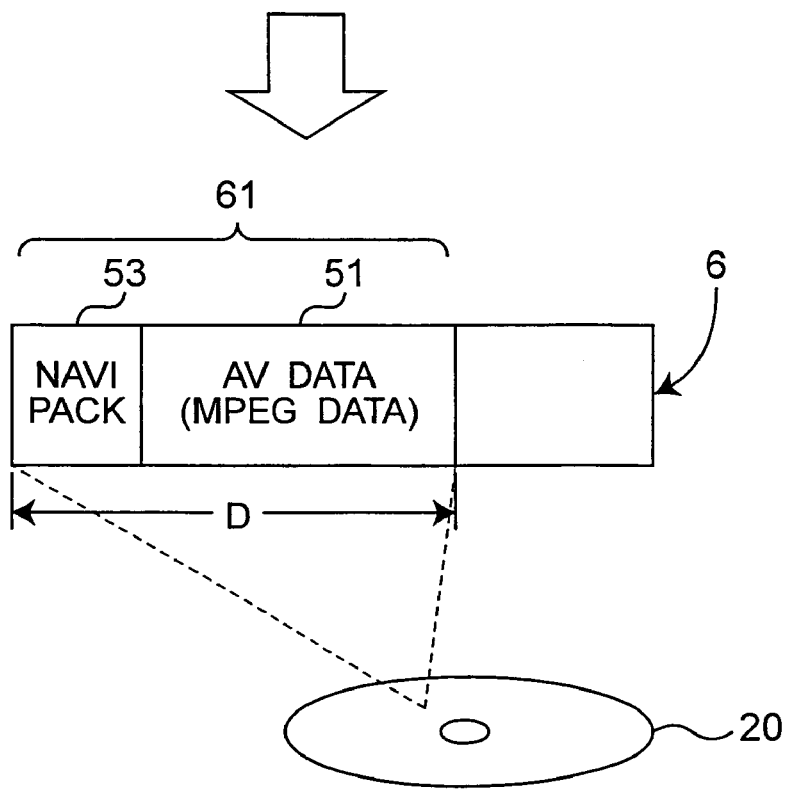

Therefore, generally, when recording in real time in a recording medium 20, as shown in FIG. 5B, Cell data 61 including Navigation pack 53 is once compiled on a buffer memory 6, and then recorded in the recording medium 20. At this time, the actual data size D of Cell data 61 compiled on the buffer memory 6 is established. The data size D is used as the basic data unit in actual reproduction. In this embodiment, when recording in the first recording layer, the actual Cell data size D compiled on the buffer memory 6 is compared with unrecorded region size of the first recording layer, and when the unrecorded region size becomes smaller than the Cell data size D, it is judged that the recording position in the first recording layer has reached the end, and the recording layer is changed from the first recording layer to the second recording layer.

Figure 6A:
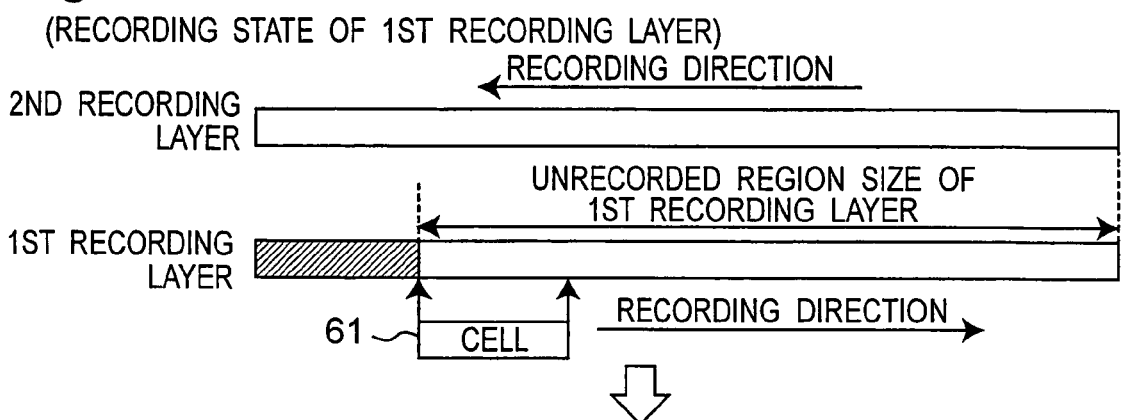
FIGS. 6A to 6C are explanatory diagrams of changeover method from the first recording layer to the second recording layer in embodiment 2 of the invention.
Figure 6B:
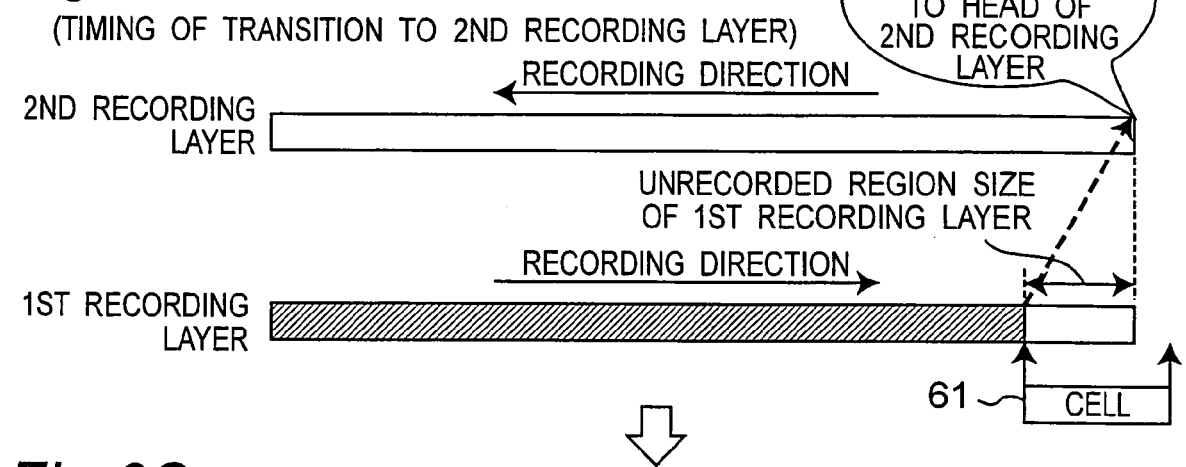
Figure 6C:
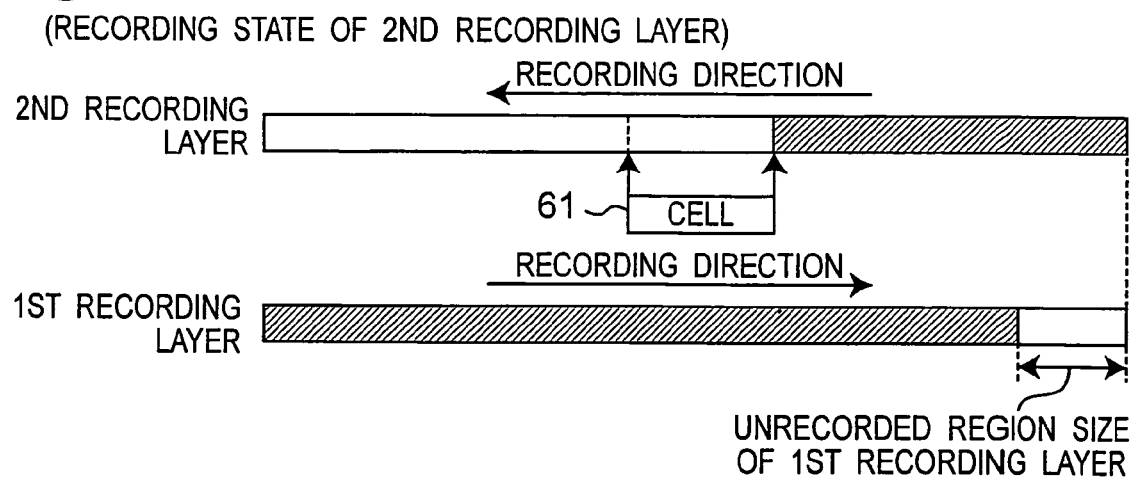

More specifically, as shown in FIG. 6A, recording starts from the first recording layer. While recording in the first recording layer, the actual data length of Cell data compiled on the buffer memory 6 is compared with the unrecorded region size of first recording layer. As shown in FIG. 6B, when the actual data length of Cell data 61 is longer, recording in the first recording layer is stopped at the Cell boundary, and the recording layer is changed to the second recording layer, and the AV data after the Cell data compiled on the buffer memory 6 is recorded in the second recording layer (see FIG. 6C).

In embodiment 1 or embodiment 2, the recording in the second recording layer starts while the unrecorded region is left over in the first recording layer (see FIG. 3D). In a general DVD player, if recorded in one layer only out of two recording layers, there may be a case that data can not be read out due to characteristics of the drive. Accordingly, if unrecorded region is left over in the first recording layer, a problem occurs in compatibility of the recording media. According to the DVD-Video standard, moreover, presence of discontinuous logical address is not permitted in stream data in the same title.

Figure 7A:
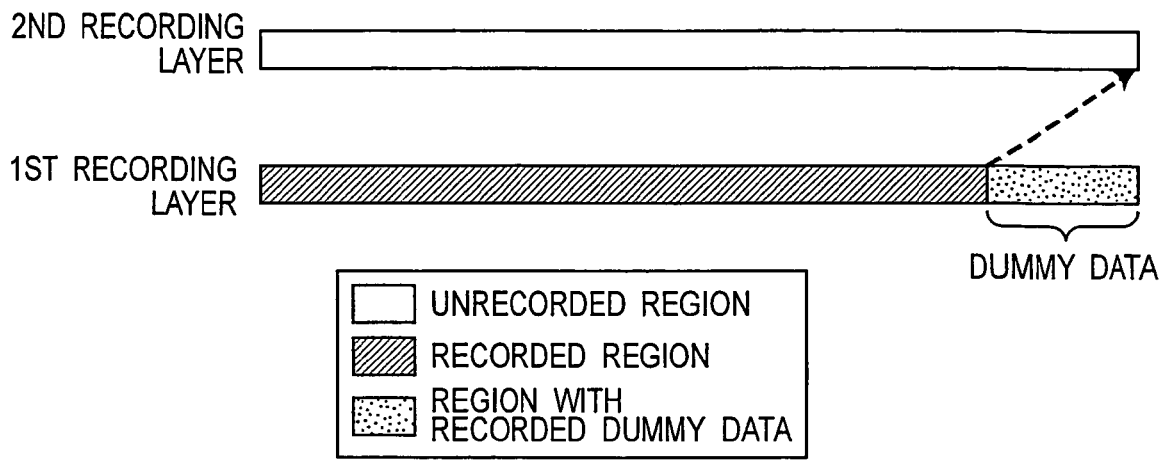
FIG. 7A is an explanatory diagram of recording of dummy data in embodiment 3 of the invention.

To solve these problems, in this embodiment, dummy data is recorded in whole unrecorded region of the first recording layer at either of the following timings after transfer to recording in the second recording layer as shown in FIG. 7A to eliminate unrecorded state:

(1) After recording in the first recording layer, before starting recording in the second recording layer; and (2) When finalizing the recording medium.

In this case, the dummy data is stream data composed of one Cell, of which size is same as the unrecorded region size of the first recording layer. Since the timing is fixed, (1) is better than (2).

The dummy data is composed as follows. That is, at least the beginning VOBU of Cell includes video data, and the remaining VOBUs are composed of padding packets. The padding packet has a data structure specified in ISO/IEC 13818-1 Table 2-17 as the standard of MPEG2, the packet start code is 0x000001BE, and data 0xFF is recorded in all data regions.

Figure 7B:
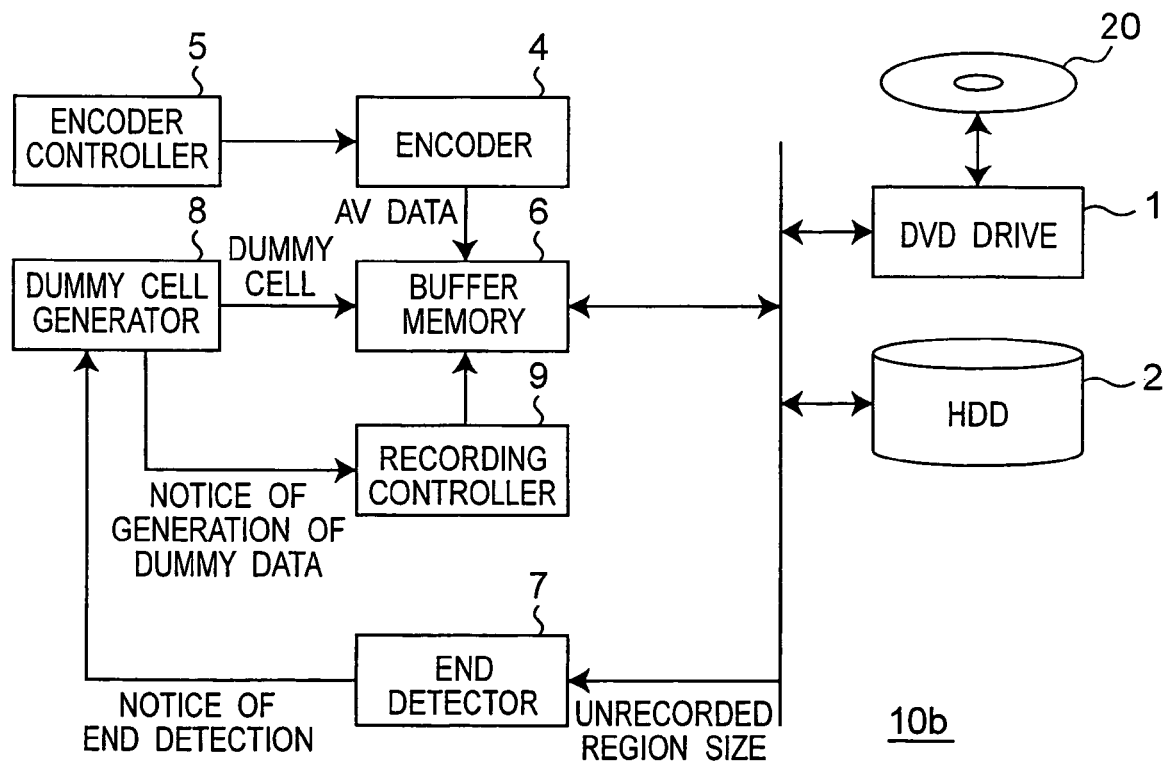
FIG. 7B is a block diagram of information recording apparatus in embodiment 3 of the invention.

FIG. 7B shows a configuration of information recording apparatus of the embodiment capable of writing dummy Cell. The information recording apparatus 10b of this embodiment further includes a dummy Cell generator 8 for receiving the end detection notice signal and generating the dummy Cell data, in addition to the configuration shown in embodiment 1. The dummy Cell generator 8 can receive the end detection notice signal from the end detector 7. When receiving the end detection signal, the dummy Cell generator 8 generates the dummy Cell data, writes it to the buffer memory 6, and notifies the recording controller 9 of the generation of the dummy data. When receiving the dummy data generation notice, the recording controller 9 stops recording of AV data, and starts recording of dummy Cell data. When recording of dummy Cell data is over, recording of AV data is resumed. The layers are changed over, while recording the dummy Cell data or after finishing recording. Other process is same as in embodiments 1 and 2.

This embodiment relates to a recording method of starting recording of the second recording layer from a radius position on the second recording layer corresponding to a radius position of recording end of the first recording layer.

FIGS. 8A to 8D show the recording method from the first recording layer to the second recording layer in the embodiment. In the foregoing embodiments, recording of the second recording layer is started from the outside end position of the second recording layer (see FIG. 3D, FIG. 6C). By contrast, in this embodiment, as shown in FIG. 8D, recording of the second recording layer is not started from the beginning of the recording region, but started from a radius position on the second recording layer corresponding to the radius position of recording end position on the first recording layer. The advantage of this recording method is that the seek time from the first recording layer to the second recording layer is shorter because the end of stream data in first recording layer and the beginning of stream data in second recording layer are in the relation of upper and lower layers physically at the same radius position. At this time, a region R2 from the beginning of the second recording layer to recording start point of the second recording layer is unrecorded region (unrecorded region of the second recording layer), but it is processed by dummy data recording as follows.

According to specification in pages VI 3-5, section 3.1.5 of non-patent document 1, one Cell should not be recorded over plural layers. Thus this embodiment generates first dummy data composed of one Cell of which size is equal to the size of unrecorded region R1 of the first recording layer, and second dummy data composed of one Cell of which size is equal to the size of the unrecorded region R2 of the second recording layer. The first and second dummy data are recorded in unrecorded regions R1 and R2 after finishing recording of the first recording layer and before starting recording of the second recording layer, or when finalizing.

Since the first dummy data and second dummy data are composed of a Cell, respectively, information about beginning address and terminating address of Cell is included in the video title set address table information (VTS_C_ADTI) in VTS IFO which is specified in pages VI 4-77 of non-patent document 1.

In this embodiment, when changing over the recording layer from the first recording layer to the second recording layer, the Cell to be recorded is divided, and recorded in each layer. The information recording apparatus has the same configuration of that shown in FIG. 7B.

Suppose usage of dubbing AV data existing in a device such as hard disk drive 2 into recording medium 20. In this case, since the AV data is already present in the hard disk drive 2, the time restriction is not so severe as in real-time recording. Hence the following control is possible near the end of firs layer in order to satisfy the DVD-Video standard that one Cell should not be recorded over plural layers.

Figure 9A:
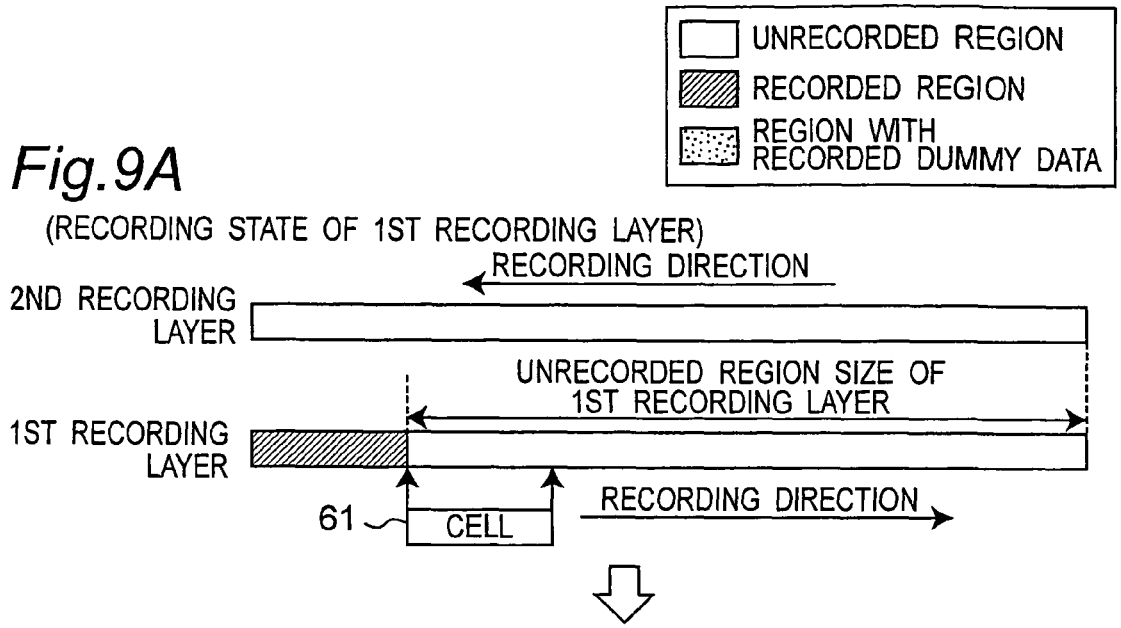
FIGS. 9A to 9C are explanatory diagrams of changeover method from the first recording layer to the second recording layer in embodiment 5 of the invention.
Figure 9B:
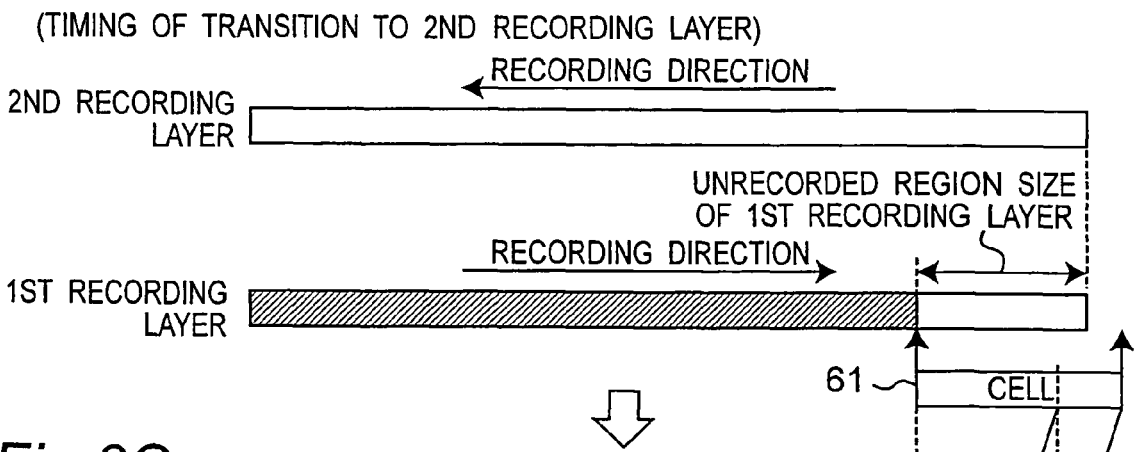
Figure 9C:
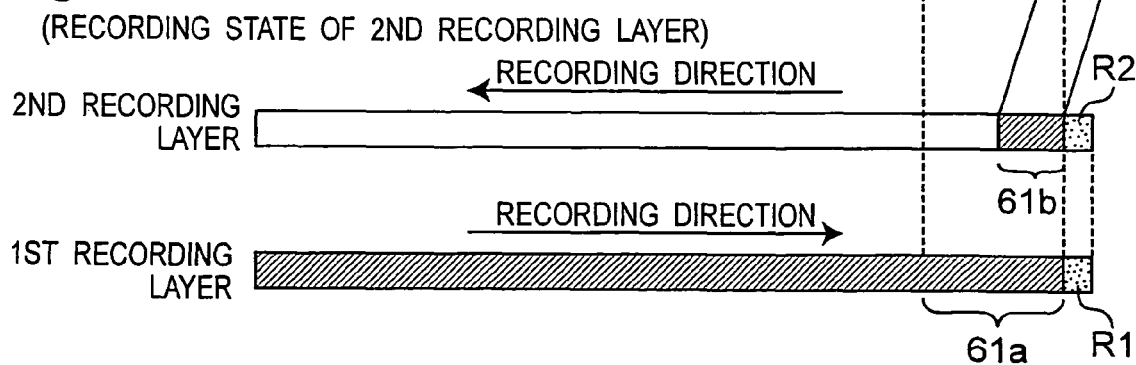

As shown in FIG. 9A, recording is started from the first recording layer, and when the size of unrecorded region of the first recording layer becomes smaller than the size of Cell data 61 near the end of the first recording layer as shown in FIG. 9B, in order to satisfy the DVD-Video standard that one Cell should not be recorded in plural layers, the original Cell (61) is divided to generate a first division Cell (61a) and a second division Cell (61b) as shown in FIG. 9C. These division Cells (61a, 61b) are recorded in the first recording layer and the second recording layer, respectively. In this embodiment, too, dummy data is recorded in regions R1 and R2.

Figure 10:
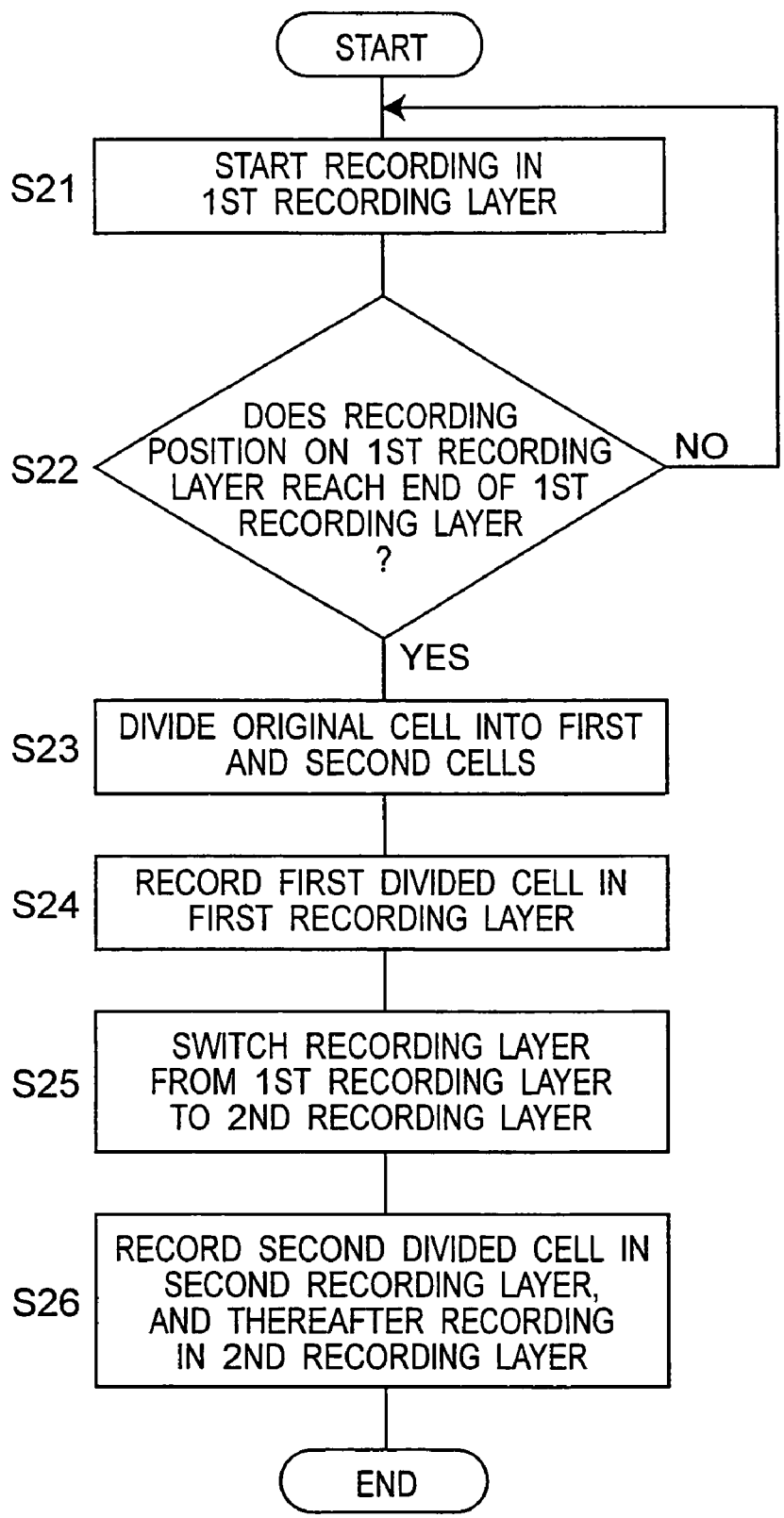
FIG. 10 is a flowchart of recording process for changing over from the first recording layer to the second recording layer in embodiment 5 of the invention.

FIG. 10 is a flowchart of recording method by the information recording apparatus according to this embodiment.

The recording controller 9 judges whether the recording position of the first recording layer reaches the end in the method described in the foregoing embodiments while recording in first recording layer (S21), and judges affirmatively (S22), the original Cell (61) is divided into the first division Cell (61a) and the second division Cell (61b) (S23). The first division Cell (61a) is recorded in the first recording layer (S24), the recording layer is changed to the second recording layer (S25), and the second division Cell (61b) is recorded in the second recording layer, and thereafter data is recorded in the second recording layer (S26).

Figure 11:
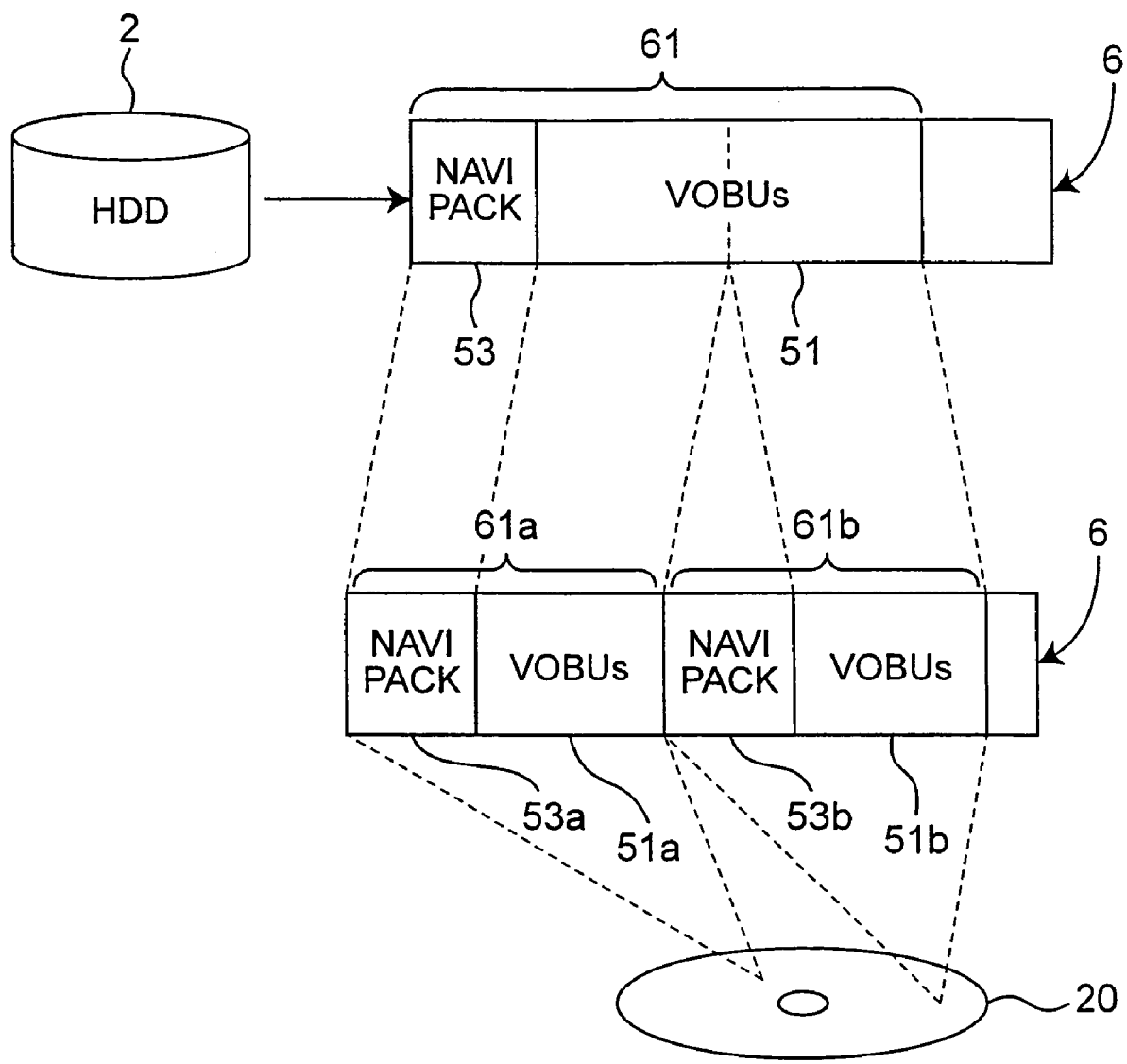
FIG. 11 is an explanatory diagram of division of Cell data in embodiment 5 of the invention.

Referring to FIG. 11, a method of generating the division Cell is more specifically described. The original VOBU group 51 including plural VOBUs is divided in units of VOBUs. At the beginning of first divided VOBU group 51a and second divided VOBU group 51b, Navigation packs 53a and 53b are attached, respectively. The information of Navigation packs 53a and 53b includes reproduction control information and search information according to non-patent document 1. The reproduction control information specifies reproduction start time and reproduction end time of the VOBU group. The search information specifies an address of each VOBU in VOBU group.

Therefore, Navigation pack 53a is newly added to the beginning of the second VOBU group 51b obtained by dividing the Cell 61 to generate the second division Cell (61b). In the first VOBU group 51a in which Navigation pack 53 has been already added to the beginning, the Navigation pack 53 is revised to Navigation pack 53a according to the first VOBU group 51a to generate the first division Cell (61a). The generated first division Cell (61a) is recorded in the first recording layer, the recording layer to be used is changed over to the second recording layer, and the second division Cell (61b) is recorded in the second recording layer.

Thus, according to these embodiments, when recording in the first recording layer, the unrecorded region size of the first recording layer is compared with a specified Cell unit size to judge if a vacant region is sufficient or not. If the vacant region is not sufficient, recording in the first recording layer is stopped, and recording in the second recording layer is started. Hence, one Cell is not recorded in plural layers, and it is possible to record by satisfying the requirements of DVD-Video standard. Especially, according to this embodiment, as compared with embodiments 1 and 2, the efficiency of using the recording region is further enhanced.

In the embodiments, the recording method conforming to DVD standard is explained. However, the concept of the invention is not limited the application conforming to DVD standard only, but may be applied to other conditions of use in which recording of specified data unit over two layers is prohibited or not recommended.

The concepts of the respective embodiments may be properly combined so far as not contrary to each other in structure or action.

The invention is described herein in relation to specific embodiments, but the invention may be changed and modified in several forms, easily for those skilled in the art, without departing from the spirit of the essential characteristics thereof. Hence the invention is not limited to the present embodiments alone, but is defined by the appended claims thereof. This application is based upon and claims the benefit of priority from the prior Japanese Patent Application No. 2004-214037, filed on Jul. 22, 2004, the entire contents of which are incorporated herein by reference.

The invention can be applied in recording technology into recording medium (for example, DVD-R (Digital Versatile Disk-Recordable)) having two layers for recording information in the case it is required that data in specified data management unit should be recorded in one layer only. The invention is useful for an information recording apparatus conforming to, for example, DVD-Video standard.

The invention claimed is:

1. A recording method for recording AV data in a unit of a cell as an information recording/reproducing unit to a recording medium having a first recording layer and a second recording layer, the cell including a plurality of temporally continuous minimum data units, each temporally continuous minimum data unit being a unit for recording and reproducing the AV data to and from the recording medium, the method comprising:

during recording the AV data in a unit of a cell in the first recording layer,
detecting a size of an unrecorded area of the first recording layer by continuously detecting an end of the cell;
comparing the size of the unrecorded area of the first recording layer with a maximum allowable size of the cell; and
stopping recording in the first recording layer at a beginning of the unit of the cell when the size of the unrecorded area is smaller than the maximum allowable size of the cell, and recording subsequent data of the AV data in the second recording layer.

2. The recording method according to claim 1, wherein dummy data is recorded in the unrecorded area of the first recording layer after stopping recording in the first recording layer and before starting recording in the second recording layer, and as the dummy data, video data is recorded in a first minimum data unit in the cell and padding packets are recorded in remaining minimum data units in the cell.

3. The recording method according to claim 1, wherein a dummy data is recorded in the unrecorded area of the first recording layer when finalizing after stopping recording in the first recording layer, and as the dummy data, video data is recorded in a first minimum data unit in the cell and padding packets are recorded in remaining minimum data units in the cell.

4. The recording method according to claim 1, wherein a radius position of recording start position on the second recording layer corresponds to a radius position of recording end position on the first recording layer.

5. The recording method according to claim 1, wherein data to be recorded in the first recording layer is divided into first and second data units when a size of the unrecorded area becomes smaller than the specified value, and the divided first data unit is recorded in the first recording layer and the divided second data unit is recorded in the second recording layer.

6. An information recording apparatus for recording AV data in a unit of a cell as an information recording/reproducing unit to a recording medium having a first recording layer and a second recording layer, the cell including a plurality of temporally continuous minimum data units, each temporally continuous minimum data unit being a unit for recording and reproducing the AV data to and from the recording medium, the apparatus comprising:

an encoder configured to encode data;
a buffer configured to temporarily store the encoded data;
a drive configured to record the encoded data in the first or second recording layer of the recording medium;
a recording controller configured to control the encoder, the buffer and the drive; and
a detector configured to detect whether the recording position of the first recording layer reaches an end of the first recording layer during recording the AV data in a unit of a cell in the first recording layer, wherein, during recording the AV data in the unit of the cell in the first recording layer, the detector detects a size of an unrecorded area of the first recording layer by continuously detecting an end of the cell, compares the size of the unrecorded area of the first recording layer with a maximum allowable size of the cell, and determines that the recording position of the first recording layer reaches the end when the size of the unrecorded area becomes smaller than the maximum allowable size of the cell, and the recording controller, when it is determined that the recording position of the first recording layer reaches the end, controls the recording so as to stop the recording in the first recording layer at a beginning of the unit of the cell, and record subsequent data of the AV data in the second recording layer.

7. The information recording apparatus according to claim 6, wherein the recording controller records dummy data in the unrecorded area of the first recording layer after stopping recording in the first recording layer and before starting recording in the second recording layer, and as the dummy data, video data is recorded in a first minimum data unit in the cell and padding packets are recorded in remaining minimum data units in the cell.

8. The information recording apparatus according to claim 6, wherein the recording controller records dummy data in the unrecorded area of the first recording layer when finalizing after stopping recording in the first recording layer, and as the dummy data, video data is recorded in a first minimum data unit in the cell and padding packets are recorded in remaining minimum data units in the cell.

9. The information recording apparatus according to claim 6, wherein a radius position of a recording start position on the second recording layer corresponds to a radius position of a recording end position on the first recording layer.

10. The information recording apparatus according to claim 6, wherein, when it is detected that the recording position of the first recording layer reaches the end, the recording controller controls the recording so as to divide the data to be recorded in the first recording layer into the first and the second data units, and record the divided first data unit in the first recording layer and record the divided second data unit in the second recording layer.

11. The information recording apparatus according to claim 6, further comprising a hard disk drive for storing data.

12. A recording method for recording AV data in a unit of a cell as an information recording and reproducing unit to a recording medium having a first recording layer and a second recording layer, the cell including a plurality of temporally continuous minimum data units, each temporally continuous minimum data unit being a unit for recording and reproducing the AV data to and from the recording medium, the method comprising:

during recording the AV data in a unit of a cell in the first recording layer, detecting a size of an unrecorded area of the first recording layer by continuously detecting an end of the cell;

comparing the size of the unrecorded area of the first recording layer with a size of data being about to be recorded in the first recording layer; and stopping recording in the first recording layer at a beginning of the unit of the cell when the size of the unrecorded area is smaller than the size of data being about to be recorded, and recording a subsequent data of the AV data in the second recording layer.

13. The recording method according to claim 12, wherein dummy data is recorded in the unrecorded area of the first recording layer after stopping recording in the first recording layer and before starting recording in the second recording layer, and as the dummy data, video data is recorded in a first minimum data unit in the cell and padding packets are recorded remaining minimum data units in the cell.

14. The recording method according to claim 12, wherein dummy data is recorded in the unrecorded area of the first recording layer when finalizing after stopping recording in the first recording layer, and as the dummy data, video data is recorded in a first minimum data unit in the cell and padding packets are recorded in remaining minimum data units in the cell.

15. The recording method according to claim 12, wherein a radius position of recording start position on the second recording layer corresponds to a radius position of recording end position on the first recording layer.

16. The recording method according to claim 12, wherein data to be recorded in the first recording layer is divided into first and second data units when a size of the unrecorded area becomes smaller than the specified value, and the divided first data unit is recorded in the first recording layer and the divided second data unit is recorded in the second recording layer.

17. An information recording apparatus for recording AV data in a unit of a cell as an information recording and reproducing unit to a recording medium having a first recording layer and a second recording layer, the cell including a plurality of temporally continuous minimum data units, each temporally continuous minimum data unit being a unit for recording and reproducing the AV data to and from the recording medium, the apparatus comprising:

an encoder configured to encode data;

a buffer configured to temporarily store the encoded data;

a drive configured to record the encoded data in the first or second recording layer of the recording medium;

a recording controller configured to control the encoder, the buffer and the drive; and a detector configured to detect whether the recording position of the first recording layer reaches an end of the first recording layer during recording the AV data in a unit of a cell in the first recording layer, wherein, during recording the AV data in the unit of the cell in the first recording layer, the detector detects a size of an unrecorded area of the first recording layer by continuously detecting an end of the cell, compares the size of the unrecorded area of the first recording layer with a size data being about to be recorded in the first recording layer, and determines that the recording position of the first recording layer reaches the end when the size of the unrecorded area becomes smaller than the size of data being about to be recorded, and the recording controller, when it is determined that the recording position of the first recording layer reaches the end, controls the recording so as to stop the recording in the first recording layer at a beginning of the unit of the cell, and record subsequent data of the AV data in the second recording layer.

18. The information recording apparatus according to claim 17, wherein the recording controller records dummy data in the unrecorded area of the first recording layer after stopping recording in the first recording layer and before starting recording in the second recording layer, and as the dummy data, video data is recorded in a first minimum data unit in the cell and padding packets are recorded in remaining minimum data units in the cell.

19. The information recording apparatus according to claim 17, wherein the recording controller records dummy data in the unrecorded area of the first recording layer when finalizing after stopping recording in the first recording layer, and as the dummy data, video data is recorded in a first minimum data unit in the cell and padding packets are recorded in remaining minimum data units in the cell.

20. The information recording apparatus according to claim 17, wherein a radius position of the recording start position on the second recording layer corresponds to a radius position of a recording end position on the first recording layer.

21. The information recording apparatus according to claim 17, wherein when it is detected that the recording position of the first recording layer reaches the end, the recording controller controls the recording so as to divide the data to be recorded in the first recording layer into a first and a second data units, and record the divided first data unit in the first recording layer and record the divided second data unit in the second recording layer.

22. The information recording apparatus according to claim 17, further comprising a hard disk drive for storing data.

* * * * *

UNITED STATES PATENT AND TRADEMARK OFFICE
CERTIFICATE OF CORRECTION

| | |
|---|---|
| PATENT NO. | : 8,134,904 B2 |
| APPLICATION NO. | : 10/569690 |
| DATED | : March 13, 2012 |
| INVENTOR(S) | : Takenori Maehasi |

It is certified that error appears in the above-identified patent and that said Letters Patent is hereby corrected as shown below:

TITLE PAGE

Item 30, Foreign Application Priority Date, Jul. 22, 2004 (JP) 2004-214307, should read
-- Jul. 22, 2004 (JP) 2004-214037 --.

Signed and Sealed this
Nineteenth Day of June, 2012

David J. Kappos
*Director of the United States Patent and Trademark Office*